April 26, 1932.  W. HOLDSWORTH  1,855,883

COMB CIRCLE

Filed May 21, 1930  2 Sheets-Sheet 1

Inventor:
Willie Holdsworth
By
Attorneys.

April 26, 1932. W. HOLDSWORTH 1,855,883
COMB CIRCLE
Filed May 21, 1930 2 Sheets-Sheet 2

Inventor:
Willie Holdsworth
By
Attorneys.

Patented Apr. 26, 1932

1,855,883

UNITED STATES PATENT OFFICE

WILLIE HOLDSWORTH, OF PROVIDENCE, RHODE ISLAND

COMB-CIRCLE

Application filed May 21, 1930. Serial No. 454,485.

This invention relates to improvements in comb-circles for use in the textile art, particularly on so-called "Noble" combers.

One object of the invention is to provide a circular comb, or comb-circle as it is commonly termed, comprising concentric toothed sections which are individually detachable for repair or replacement of the teeth.

Another object of the improvement is to provide a comb-circle having concentric sections which may be removed and replaced by others to change the pitch or spacing of the teeth in the different rows.

Another object of the invention is to provide a comb-circle having its teeth secured in place in such manner as to eliminate drilled, reamed or broached holes, whereby to simplify its structure and economize in the cost of manufacture.

Another object of the invention is to provide a comb-circle having the teeth in the several rows more accurately spaced and perfectly alined.

Further objects of the improvement are set forth in the following specification which describes a preferred form of construction of the invention, by way of example, as illustrated by the accompanying drawings. In the drawings.

Figure 1:
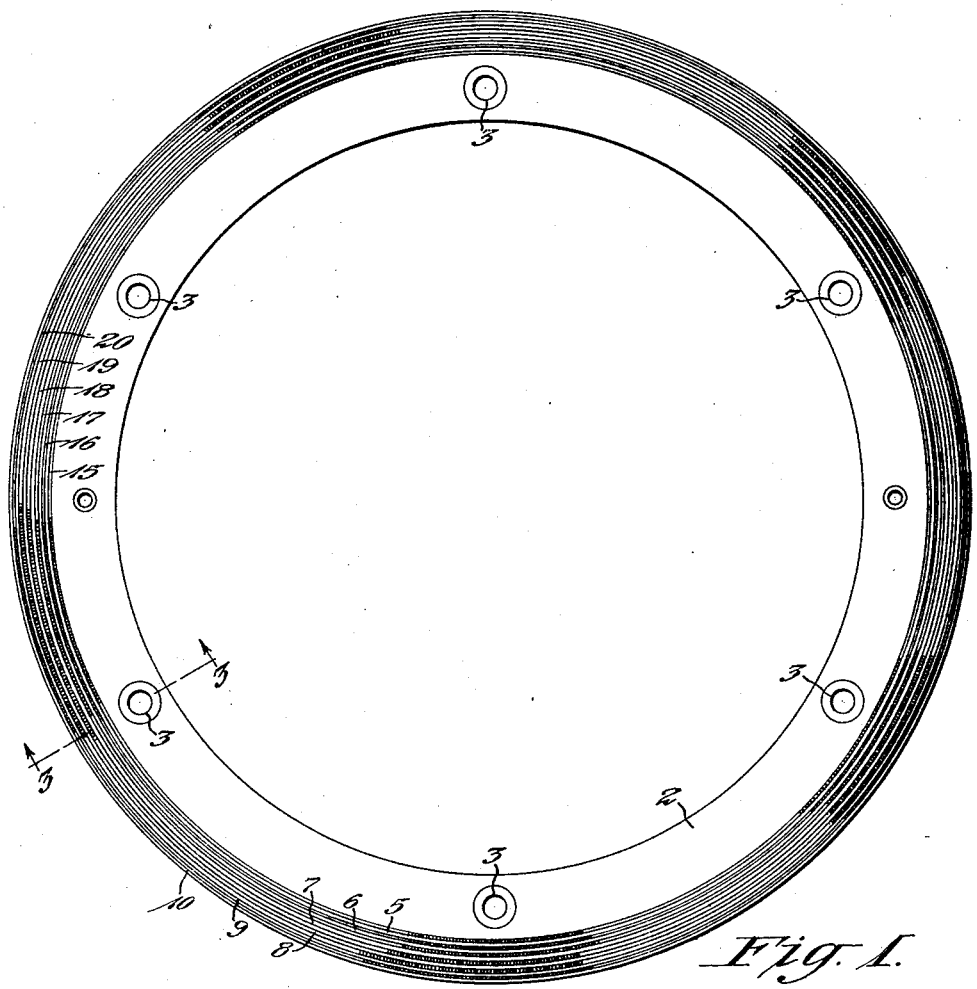
Fig. 1 is a plan view of the improved comb-circle.

The present invention consists in general of a novel form of comb-circle composed of an inner, main or master ring having bolt holes or other suitable means for fastening it in place on the machine, and a series of outer annular sections or rings assembled thereon with teeth projecting therefrom in concentric rows spaced radially outward with respect thereto. The invention further contemplates an improved construction of the comb-circle in which the teeth are soldered or sweated onto the inner circumference of each ring-section to be clamped or bound against the outer periphery of the next adjacent section of the series, whereby to securely hold the teeth in place without requiring them to be set in drilled or broached holes in the ring.

Referring to the drawings, 2 designates the inner master ring which is of suitable dimensions in accordance with the type of machine on which it is to be used, and of substantially flat cross-section with countersunk holes 3 spaced around its circumference to receive the bolts which attach it in place. Assembled on the master ring 2 are a plurality of thinner annular sections or rings 5, 6, 7, 8, 9 and 10 of appropriate number in accordance with the number of rows of teeth to be provided.

The sections 5, 6, 7, 8, 9 and 10, or certain of them, may be of varying width or thickness radially in order to graduate the spacing of the concentric rows of teeth carried thereby. As illustrated in the present drawings, the first or inner ring 5 is of the greatest thickness, the next outer ring 6 of less thickness, and the remaining four rings 7, 8, 9 and 10 of substantially the same thickness. This arrangement provides that the two inner rows of teeth 15 and 16 are spaced farthest apart radially, with the next outer row 17 a slightly less distance outwardly from the row 16, and the four outer rows 17, 18, 19 and 20 equidistantly spaced. While the drawings illustrate a conventional arrangement or disposition of the rows of teeth their spacing is an arbitrary matter and may be varied at will in accordance with the requirements of the work to be performed. Likewise, the pitch or circumferential spacing of the teeth in the different rows is a matter of choice; for example, the inner row of teeth 15 are sometimes spaced twenty to the inch, those in the next row 16 twenty-five to the inch, while the teeth in the remaining rows 17, 18, 19 and 20 have the same pitch of forty-four to the inch. It is also to be understood that a greater or less number rows of teeth may be provided, all within the scope and purview of the present invention.

The inner master ring 2 may be constructed of any suitable metal, for example, steel, hardened and ground to accurate dimensions and, if required, plated with nickel or chromium, or otherwise treated to prevent rust and corrosion. The master ring 2 is thus rendered stronger and more durable than the usual brass ring, to resist breakage or distortion in use or during handling, while at the same time being adapted for economical methods of manufacture to secure accuracy of dimension and a true fit when applied to the machine on which it is used. The toothed rings or sections 5, 6, 7, 8, 9 and 10 may be made of brass or suitable alloyed metal capable of effecting a strong bond with the solder used to secure the teeth to their inner circumferential faces.

Figure 2:
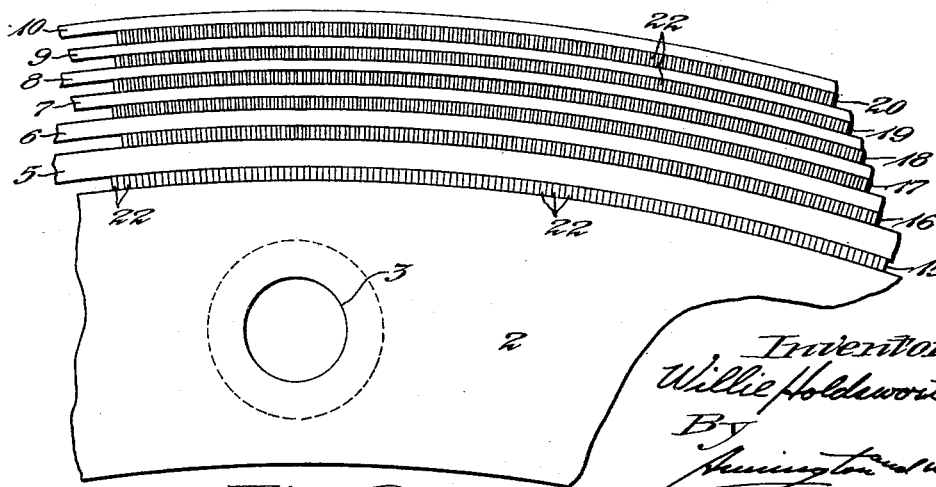
Fig. 2 is an enlarged bottom plan view of a portion of the comb-circle.

The teeth or points on the comb-circle are usually made of steel, being constructed with relatively flat shanks or butt portions 22, as shown most clearly in Fig. 2, and elongated sharply-pointed working ends resembling needles. The teeth may vary in size in accordance with the pitch or spacing in the rows, those in the inner rows being relatively coarse while the outer ones are quite fine.

Figure 6:
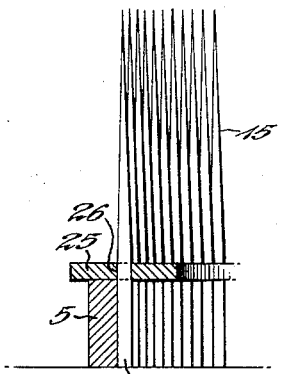
Fig. 6 is a sectional view showing one section of the comb-circle with the template or gauge employed for setting its teeth.

The teeth are assembled on and secured to the inner rim of each of the outer rings or sections of the comb-circle by a soldering or "sweating" operation, the solder being flowed around the shanks 22 of the teeth which are substantially in contact or closely adjacent with respect to their flat sides. For convenience and facility of manufacture, and to gauge the teeth in spaced relationship and exact alinement, I preferably employ a template or fixture for the teeth in applying them to position to be soldered or sweated on to the inner circumference of the rings or sections 5, 6, 7, 8, 9 and 10. Such a fixture may comprise simply an annular or ring-like template 25, as shown in Fig. 6, having broached or reamed rectangularly-shaped holes 26 for receiving the shanks 22 of the teeth. The template 25 may be a complete ring or a segment thereof, adapted to be applied over one or another of the annular sections of the comb-circle in position with the shanks 22 of the teeth or pins abutting the inner face of the ring to which the teeth are to be soldered. With the teeth or pins thus held in spaced alinement it is a simple and easy matter to flow the solder by application of heat to cause it to secure the teeth in place on the annular sections of the comb-circle. The fixture or template 25 is removed when the solder is hardened by lifting it off from the ring 5 with the teeth sliding out from its holes 26, the teeth being more accurately alined and uniformly spaced through the use of the fixture than is possible in inserting them in holes in the comb-circle by the usual method.

Figure 4:
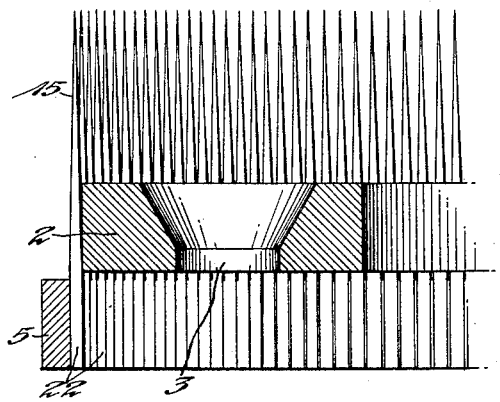
Fig. 4 is a similar sectional view showing the method of assembling the first tooth-section on the inner master ring.

After the teeth or pins have been soldered in place the several sections of the comb-circle are assembled on the master ring 2 in the manner as next explained. Referring to Fig. 4 of the drawings, the first ring 5 is placed in concentric relationship with the master ring 2 in a press or other suitable machine to force it onto the periphery of the latter. It will be understood that the outer circumference of the master ring 2 is of appropriate diameter to adapt it to enter the interior of the ring 5 with a "force" fit against the edges of the shanks 22 of the teeth 15 soldered thereto. As the outer ring 5 is forced onto the master ring 2 the teeth 15 will be clamped between their opposite annular faces to securely hold them in place.

Figure 3:
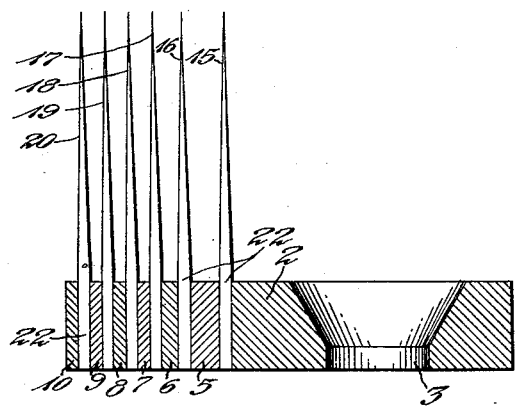
Fig. 3 is an enlarged sectional elevation of the comb-circle taken on line 3—3 of Fig. 1 and illustrating the arrangement of the annular toothed sections assembled on an inner master ring.
Figure 5:
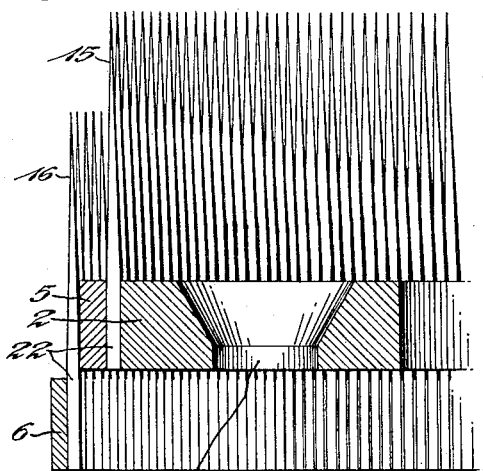
Fig. 5 is a similar view showing the first tooth-section assembled on the master ring and the next or second tooth-section in position for forcing it onto the first section.

The next outer ring 6 with its attached teeth 16 is then applied to the ring 5 in the same manner by forcing it over the outer circumference thereof, as clearly illustrated in Fig. 5; and other rings or sections 7, 8, 9 and 10 may be added in accordance with the number of rows of teeth required. When the complete set of rings or sections have been thus assembled the resulting composite comb-circle embodies practically an integral structure having the teeth arranged in spaced annular rows as shown in Figs. 1, 2, and 3 of the drawings.

It has been noted that the several rings or sections of the comb-circle may carry teeth of different size arranged with variations in the pitch or spacing of their points, and through the provision of the sections being detachable the arrangement of the teeth may be altered as desired for various types of work. As another important feature of improvement of the present invention, the individual sections of the comb-circle are interchangeable so that should the teeth on any one section become bent or broken in use the ring on which they are mounted may be removed and a new one substituted in its place. This is readily accomplished by simply forcing one ring off from the others and applying another in its stead. Through this provision the comb-circle may be quickly repaired without holding the machine on which it is used idle for any considerable period to remove the damaged teeth and set new ones in their place, as is necessary when the teeth are held in rows of holes in a single ring. With the present improved comb-circle the mill will require but one master ring for each comber and by carrying a small number of the interchangeable tooth-sections in reserve, repairs can be made more expeditiously without appreciable loss in production on the machine; while adjustment in the size and spacing of the teeth may also be quickly accomplished when the character of the work is to be changed.

It will also be apparent that the present improved comb-circle can be manufactured at much less cost than the ordinary type in which thousands of holes must be drilled and reamed or broached for holding the teeth or pins. Such previously used comb-circles are very expensive to manufacture and when one of the combs becomes broken or damaged in any part it must be discarded and an entirely new one provided in its place. With the present invention any one or more broken or damaged sections of the comb-circle may be removed and replaced without providing a complete new device.

With the present improved method of mounting or setting the teeth in the rings or sections of the comb, once the set of templates is provided the cost of manufacture is comparatively low. On the other hand, the teeth are securely fixed and held in place between the annular faces of the rings and it is possible to secure more accurate spacing and exact alinement of their points.

While I have herein described and illustrated the present improved comb-circle as embodying a preferred form of construction, it is to be understood that the invention is claimed in its broadest scope without limitation as to the precise structure and arrangement of the parts of the device.

I claim:

1. A comb-circle comprising a series of concentric rings with teeth arranged circumferentially thereof to project laterally herefrom, said rings adapted for detachment for repair or replacement of their teeth.

2. A comb-circle comprising a plurality of annular sections with teeth projecting laterally therefrom, said sections assembled in concentric relationship and adapted to be removed for repair or replacement of their teeth.

3. A comb-circle comprising a master ring having means for attaching it to the machine, and a plurality of toothed rings assembled in concentric relationship thereon and adapted to be detached therefrom for replacement by other sections, said toothed rings having the teeth fixed thereon to project laterally herefrom.

4. A comb-circle comprising an inner master ring having means for attaching it to the machine, a plurality of outer rings assembled in concentric relationship thereon, and rows of teeth held between the adjacent annular faces of the rings projecting laterally therefrom.

5. A comb-circle comprising a plurality of ring-like sections having teeth soldered to their annular faces, said sections assembled in concentric relationship with their teeth projecting laterally from the comb-circle in spaced rows.

6. A comb-circle comprising a plurality of annular sections of graduated diameter having teeth soldered to their circumferential faces, said sections assembled in concentric relationship one over the rim of another to hold the teeth between their opposite faces.

7. A comb-circle comprising a master ring, and a plurality of ring-sections of graduated diameter having teeth soldered to their annular faces, said tooth-sections forced one over the rim of another with the teeth held in rows therebetween and assembled in concentric relationship on the master ring.

In testimony whereof I hereunto affix my signature.

WILLIE HOLDSWORTH.

CERTIFICATE OF CORRECTION.

Patent No. 1,855,883.                                      Granted April 26, 1932, to

WILLIE HOLDSWORTH.

It is hereby certified that error appears in the printed specification of the above numbered patent requiring correction as follows: Page 3, lines 39 and 40, 54 and 55, claims 1 and 2, respectively, for the word "herefrom" read therefrom; and that the said Letters Patent should be read with these corrections therein that the same may conform to the record of the case in the Patent Office.

Signed and sealed this 14th day of June, A. D. 1932.

M. J. Moore,
Acting Commissioner of Patents.

(Seal)